(12) United States Patent
Ogue et al.

(10) Patent No.: US 10,232,808 B2
(45) Date of Patent: Mar. 19, 2019

(54) WIRE HARNESS

(71) Applicants: Yazaki Corporation, Tokyo (JP); TOYOTA JIDOSHA KABUSHIKI KAISHA, Toyota-shi (JP)

(72) Inventors: Takeshi Ogue, Makinohara (JP); Hidehiko Kuboshima, Makinohara (JP); Ryouji Hironaka, Gamagoori (JP)

(73) Assignees: YAZAKI CORPORATION, Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/441,432

(22) Filed: Feb. 24, 2017

(65) Prior Publication Data

US 2017/0246998 A1   Aug. 31, 2017

(30) Foreign Application Priority Data

Feb. 25, 2016   (JP) .................. 2016-033981

(51) Int. Cl.
| | |
|---|---|
| *B60R 16/02* | (2006.01) |
| *H01B 7/282* | (2006.01) |
| *H01R 4/70* | (2006.01) |
| *H02H 7/26* | (2006.01) |
| *H01R 4/20* | (2006.01) |

(Continued)

(52) U.S. Cl.
CPC ......... *B60R 16/0215* (2013.01); *H01B 7/282* (2013.01); *H01R 4/20* (2013.01); *H01R 4/70* (2013.01); *H01R 13/5208* (2013.01); *H01R 31/02* (2013.01); *H02H 7/26* (2013.01); *H01R 2201/26* (2013.01)

(58) Field of Classification Search
CPC . G02B 6/02; G02B 6/44; H01B 11/00; H01B 12/00; H01B 5/00; H01B 7/00; H01B 9/00; H01B 7/0045; H01B 7/282; H02G 3/04; B60R 16/0215; B60R 16/0207; H01R 4/22; H01R 2201/26; H01R 4/20; H01R 4/70; H01R 13/5208; H01R 31/02; H02H 7/26
See application file for complete search history.

(56) References Cited

U.S. PATENT DOCUMENTS 5,864,091 A * 1/1999 Sumida .................. H02G 3/088
174/50
9,029,701 B2 * 5/2015 Hara .................... B60R 16/0215
174/68.1

(Continued)

FOREIGN PATENT DOCUMENTS

CN    202294319 U    7/2012
CN    103703521 A    4/2014

(Continued)

OTHER PUBLICATIONS

Koni ( JP 2000-11851 A English Translation).*

(Continued)

*Primary Examiner* — Pete T Lee
(74) *Attorney, Agent, or Firm* — Sughrue Mion, PLLC

(57) ABSTRACT

A wire harness includes a conductive path configured to electrically connect between high-voltage devices. The conductive path includes a main line and a branch line that branches from the main line. An overcurrent cut-off portion is disposed on a way of the branch line to cut off an overcurrent.

5 Claims, 14 Drawing Sheets

(51) Int. Cl.
*H01R 13/52* (2006.01)
*H01R 31/02* (2006.01)

(56) References Cited

U.S. PATENT DOCUMENTS

| | | | |
|---|---|---|---|
| 2002/0019165 A1* | 2/2002 | Aoki | B60R 16/0207 |
| | | | 439/502 |
| 2002/0111048 A1* | 8/2002 | Kondoh | B60R 16/0207 |
| | | | 439/34 |
| 2010/0139733 A1* | 6/2010 | Jonczyk | H01H 85/201 |
| | | | 136/244 |
| 2011/0088944 A1* | 4/2011 | Ogue | B60R 16/0215 |
| | | | 174/72 A |
| 2014/0138153 A1 | 5/2014 | Toyama et al. | |
| 2015/0136482 A1 | 5/2015 | Adachi et al. | |
| 2015/0229115 A1* | 8/2015 | George | H02G 15/117 |
| | | | 307/31 |
| 2015/0279514 A1 | 10/2015 | Sato et al. | |

FOREIGN PATENT DOCUMENTS

| | | |
|---|---|---|
| CN | 104782010 A | 7/2015 |
| CN | 105140571 A | 12/2015 |
| JP | 201442443 A | 3/2014 |

OTHER PUBLICATIONS

Chinese Office Action dated Nov. 22, 2018 issued by the State Intellectual Property Office of P.R. China in Counterpart Chinese Application No. 201710106585.9.

* cited by examiner

WIRE HARNESS

CROSS REFERENCE TO RELATED APPLICATIONS

This application is based on Japanese Patent Application (No. 2016-033981) filed on Feb. 25, 2016, the contents of which are incorporated herein by reference.

BACKGROUND OF THE INVENTION

1. Field of the Invention

The present invention relates to a wire harness provided with a conductive path to establish electric connection between high-voltage devices.

2. Description of the Related Art

For example, a wire harness disclosed in JP-A-2014-42443 has been known as a background-art wire harness for establishing electric connection between high-voltage devices (accessories) mounted on a hybrid car or an electric car. The wire harness has a configuration including one or plural conductive paths, a packing member for receiving and protecting the conductive paths, an external connection unit disposed at a harness terminal to establish connection with an external high-voltage device, and plural fixation members for fixedly attaching the wire harness to a fixation target.

In the aforementioned related-art wire harness, the devices (accessories) to be connected include an inverter unit in an engine room and a battery in a car rear portion. The present inventor has wanted the wire harness to establish electric connection with another new device (accessory) in addition to those two devices. To this end, the inventor examined a structure in which a conductive path is extended from an engine-room-side harness terminal of the wire harness to the new device. However, the wire harness has to be wired to make the conductive path turn back. Thus, there is a problem that working may be complicated. In addition, the conductive path cannot be always extended from the harness terminal to the new device at the shortest distance. Thus, there is another problem that the length of the conductive path turning back is increased accordingly, to thereby increase the cost. Further, there is another problem that when there is necessity to prevent an overcurrent from flowing into the new device, the structure of the background-art wire harness cannot satisfy the necessity.

SUMMARY OF THE INVENTION

The present invention has been developed in consideration of the aforementioned situation. An object of the invention is to provide a wire harness capable of improving workability in connection with devices and reducing the cost, and capable of preventing an overcurrent from flowing.

In order to attain the foregoing object, a wire harness according to a first aspect of the invention is a wire harness including: a conductive path configured to electrically connect between high-voltage devices, wherein the conductive path includes a main line and a branch line that branches from the main line; and wherein an overcurrent cut-off portion is disposed on a way of the branch line to cut off an overcurrent.

According to a second aspect of the invention, the wire harness according to the first aspect further includes insulating and waterproofing portions that are provided for respectively corresponding to a branch connection portion and the overcurrent cut-off portion and conduct insulating function and waterproof function to the branch connection portion and the overcurrent cut-off portion, wherein the branch connection portion is provided on an electric connection part where the branch line is electrically connected to the main line.

According to a third aspect of the invention, the wire harness according to the second aspect further includes shielding members that cover the insulating and waterproofing portions respectively to shield the insulating and waterproofing portions.

According to a fourth aspect of the invention, the wire harness according to the third aspect further includes a protector that receives the insulating and waterproofing portions covered with the shielding members.

According to the above aspects of the invention, a wire harness has a structure in which a conductive path is used as a main line, a branch line is connected to the middle of the conductive line serving as the main line, and an overcurrent cut-off portion is disposed in a middle of the branch line. The insulating and waterproofing portions are provided in a connection part (branch connection portion) between the conductive path serving as the main line and the branch line, and the overcurrent cut-off portion respectively. Thus, the branch connection portion and the overcurrent cut-off portion are insulated and waterproofed. There is no problem about branching in spite of the high-voltage wire harness. In addition, according to the invention, shielding members may be further provided so that the insulating and waterproofing portions can be covered and shielded with the shielding members. In addition, a protector may be further provided so that the insulating and waterproofing portions covered with the shielding members can be received therein and protected from the outside. Incidentally, it is preferable that the overcurrent cut-off portion is disposed near the branch connection portion. Thus, not to say, those portions can be received collectively in the protector. In addition, when the protector is used, it is a matter of course that the wire harness can be wired easily in spite of existence of a branching part or a part cutting off an overcurrent. The invention is preferably applied to a long wire harness that is, for example, wired through a vehicle underfloor.

According to the first aspect of the invention, a wire harness has a structure in which a branch line is extended from an intermediate of a conductive path, and an overcurrent cut-off portion is disposed in an intermediate of the branch line. Accordingly, the conductive path does not turn back from a harness terminal position but can extend at a required shortest distance. In addition, an overcurrent can be prevented from flowing into a device to be connected to the branch line. Thus, according to the invention, there is an advantage that it is possible to improve workability in connection with devices (accessories) and reduce the cost, and there is another advantage that it is possible to prevent an overcurrent from flowing.

According to the second aspect of the invention, the following advantage can be obtained in addition to the advantages of the first aspect. That is, there is an advantage that it is possible to insulate and waterproof the branch connection portion and the overcurrent cut-off portion.

According to the third aspect of the invention, the following advantage can be obtained in addition to the advantages of the second aspect. That is, there is an advantage that shielding performance can be given to the branch connection portion from which the branch line branching, and the overcurrent cut-off portion.

According to the fourth aspect of the invention, the following advantage can be obtained in addition to the advantages of the third aspect. That is, due to the protector receiving the insulating and waterproofing portions covered with the shielding members, there is an advantage that the wire harness can be easily fixed to a wiring destination through the protector even when the branch line extends from the wire harness or even when the wire harness includes the overcurrent cut-off portion. As a result, there is an advantage that workability in wiring can be improved.

DETAILED DESCRIPTION OF THE EXEMPLARY EMBODIMENTS

A wire harness has a conductive path to establish electric connection between high-voltage devices. The conductive path serves as a main line. A branch line is connected to the middle of the conductive path serving as the main line. An electric connection part between the main line and the branch line is formed as a branch connection portion. An overcurrent cut-off portion for cutting off an overcurrent is disposed in the middle of the branch line. Insulating and waterproofing portions each serving as an insulating part and a waterproofing part are provided for the overcurrent cut-off portion and the branch connection portion respectively. The overcurrent cut-off portion is disposed near the branch connection portion.

Embodiment

Figure 1:
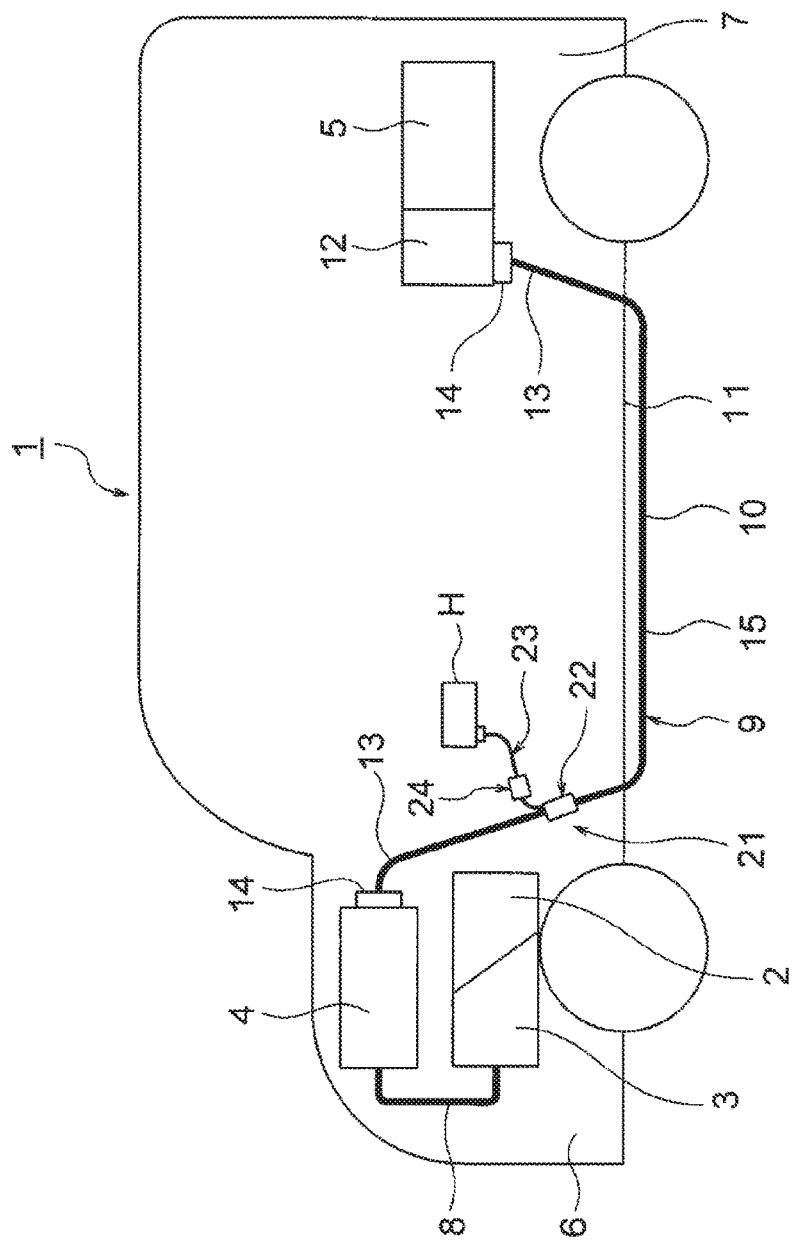
FIG. 1 is a schematic view showing a state in which a wire harness according to the invention is wired.
Figure 2:
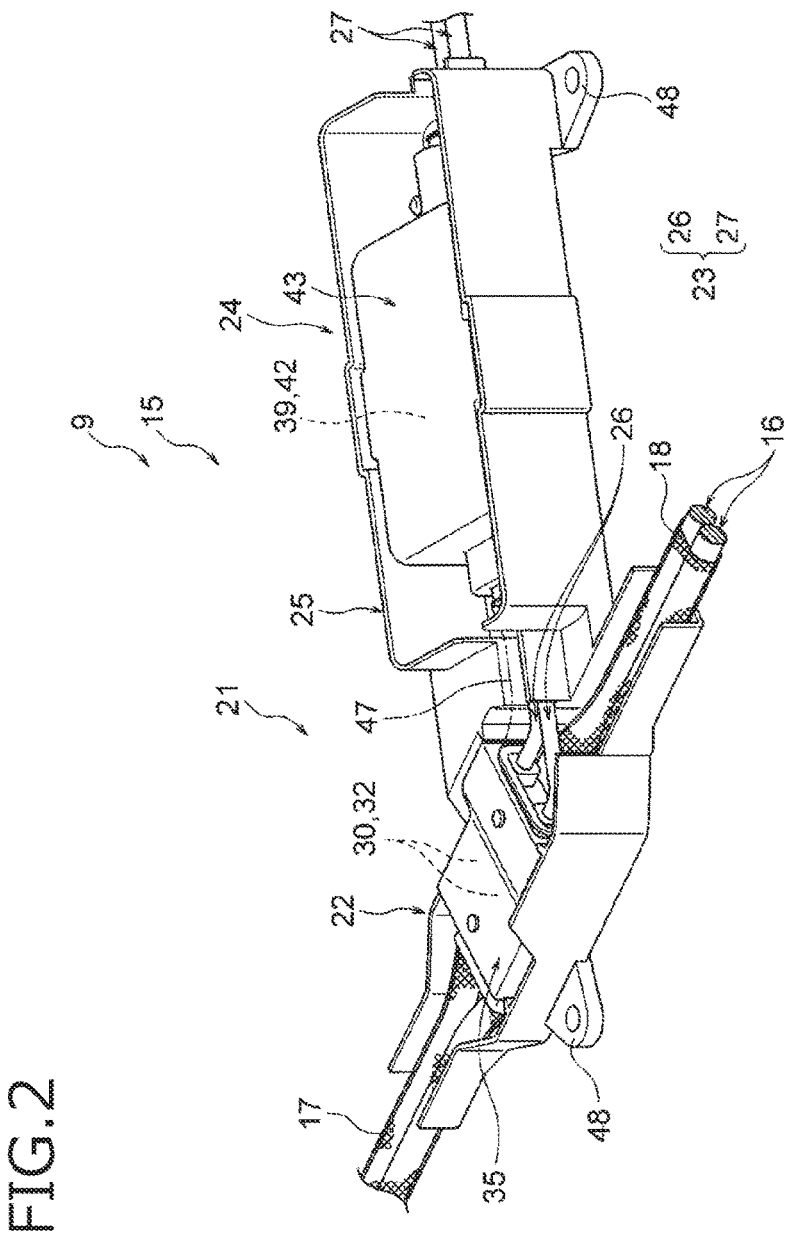
FIG. 2 is a perspective view showing a branching/overcurrent cut-off structure portion in FIG. 1.
Figure 3:
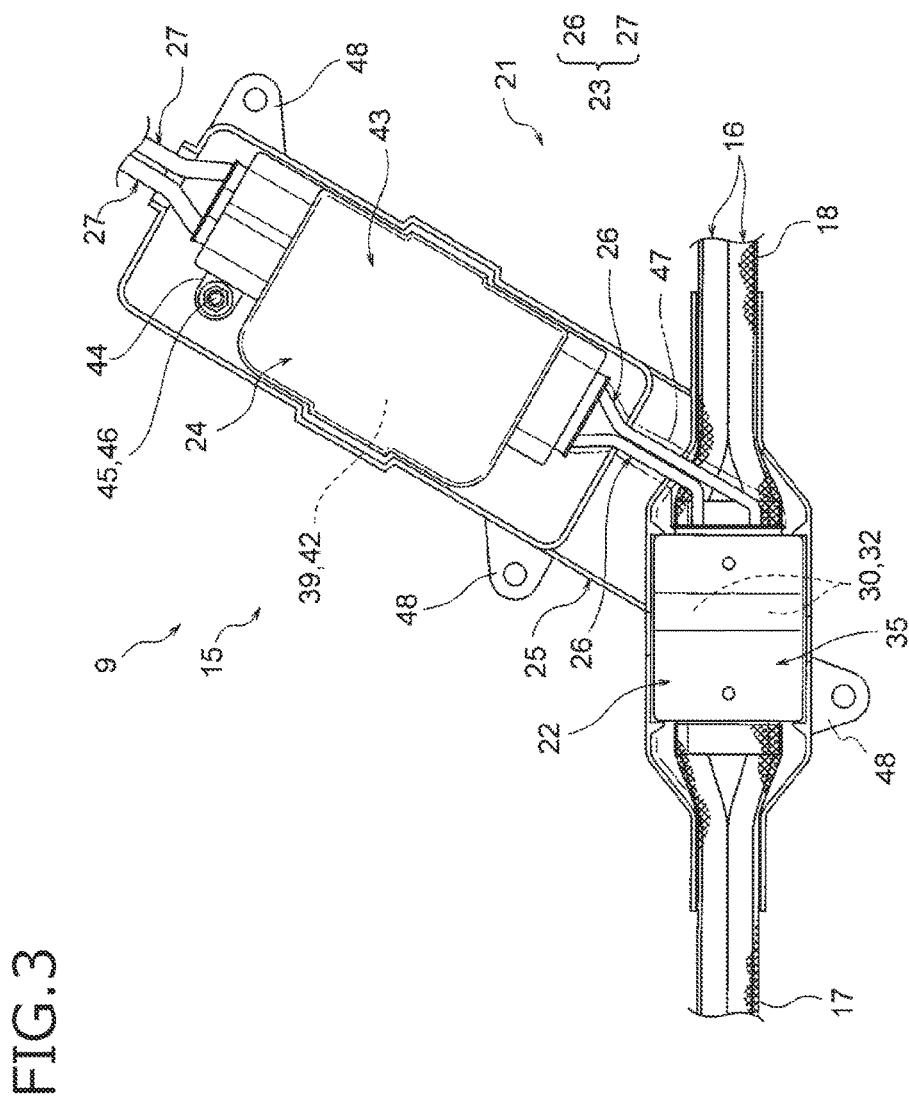
FIG. 3 is a plan view showing the branching/overcurrent cut-off structure portion in FIG. 1.

An embodiment will be described below with reference to the drawings. FIG. 1 is a schematic view showing a state in which a wire harness according to the invention is wired. FIG. 2 is a perspective view showing a branching structure portion in FIG. 1. FIG. 3 is a plan view showing the branching structure portion in FIG. 1.

In the present embodiment, the invention is applied to a wire harness to be wired in a hybrid car (which may be replaced by an electric car or the like).

<About Hybrid Car 1>

In FIG. 1, the reference numeral 1 represents a hybrid car. The hybrid car 1 is a vehicle driven by a mixture of two power sources, that is, an engine 2 and a motor unit 3. To the motor unit 3, electric power is supplied from a battery 5 (or a battery pack) through an inverter unit 4. In the embodiment, the engine 2, the motor unit 3 and the inverter unit 4 are mounted in an engine room 6 where there are front wheels etc. On the other hand, the battery 5 is mounted in a car rear portion 7 where there are rear wheels etc. (the battery 5 may be mounted in a car cabin which is located at the rear of the engine room 6).

The motor unit 3 and the inverter unit 4 are connected through a high voltage (i.e. for high voltage application) wire harness 8. In addition, the battery 5 and the inverter unit 4 are also connected through a high voltage wire harness 9. An intermediate portion 10 of the wire harness 9 is wired in an vehicle underfloor 11. In addition, the wire harness 9 is wired substantially in parallel with the vehicle underfloor 11. The vehicle underfloor 11 is a well-known body which is a so-called panel member. Through holes are formed in predetermined positions of the vehicle underfloor 11. The wire harness 9 is watertightly inserted into the through holes.

The wire harness 9 and the battery 5 are connected through a junction block 12 which is provided in the battery 5. An external connection unit such as a shield connector 14 or the like disposed at a rear-end-side harness terminal 13 of the wire harness 9 is electrically connected to the junction block 12. On the other hand, the wire harness 9 and the inverter unit 4 are electrically connected to each other through an external connection unit such as a shield connector 14 or the like disposed at a front-end-side harness terminal 13.

The motor unit 3 has a configuration including a motor and a generator. On the other hand, the inverter unit 4 has a configuration including an inverter and a converter. The motor unit 3 is formed as a motor assembly including a shield case. The inverter unit 4 is also formed as an inverter assembly including a shield case. The battery 5 is a modularized one based on Ni—MH or Li-ion. For example, an electric storage device such as a capacitor may be used. The battery 5 is not limited especially as long as it can be used in the hybrid car 1 or an electric car.

<About Wire Harness 9>

The long wire harness 9 to be wired through the vehicle underfloor 11 has a configuration including a harness body 15, and the shield connectors 14 disposed at the opposite ends of the harness body 15, that is, at the harness terminals 13 respectively. In addition, the wire harness 9 is configured to include a plurality of not-shown fixation members (such as clamps) for wiring the wire harness 9 at a predetermined position, and not-shown water stop members (such as grommets).

<About Harness Body 15>

In FIG. 1 and FIG. 2, the harness body 15 has a configuration including two conductive paths 16, cylindrical braids 17 and 18 covering the two conductive paths 16, a not-shown packaging member disposed outside the cylindrical braids 17 and 18, and a branching/overcurrent cut-off structure portion 21 including characteristic parts of the invention. The branching/overcurrent cut-off structure portion 21 is, for example, fixed to an illustrated position rising from the vehicle underfloor 11 toward the engine room 6 as illustrated in FIG. 1.

<About Branching/Overcurrent Cut-Off Structure Portion 21>

In FIGS. 1 to 3, the branching/overcurrent cut-off structure portion 21 is configured to include a branching structure portion body 22, two branch lines 23, an overcurrent cut-off structure portion body 24, a protector 25, and a not-shown protector cover. The branching/overcurrent cut-off structure portion 21 configured thus has a structure in which the branching structure portion body 22 and the overcurrent cut-off structure portion body 24 are integrated by the protector 25.

In the branching/overcurrent cut-off structure portion 21, the branching structure portion body 22 serves as a structure portion for branching the two branch lines 23 from the middles of the two conductive paths 16. On the other hand, the overcurrent cut-off structure portion body 24 is disposed in the middles of the two branch lines 23 so as to serve as a structure portion for cutting off an overcurrent. Incidentally, the branch lines 23 in the branching/overcurrent cut-off structure portion 21 are configured to include two branch lines 26 and two branch lines 27.

<About how to Describe Constituent Members>

The aforementioned constituent members of the harness body 15 will be described below. In addition, constituent members of the branching structure portion body 22 and constituent members of the overcurrent cut-off structure portion body 24 will be also described. Incidentally, the description of the branching structure portion body 22 and the overcurrent cut-off structure portion body 24 will be made along their assembling procedure.

Figure 4:
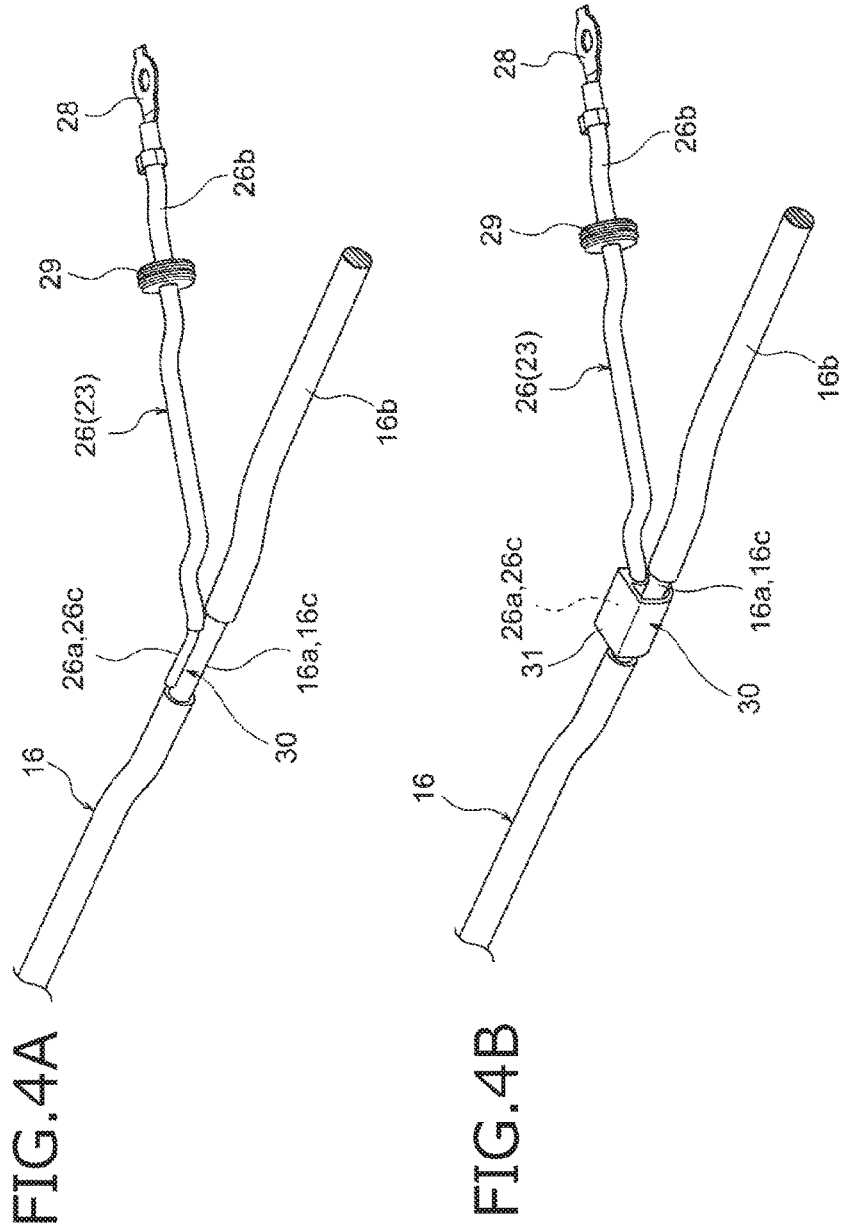
FIG. 4A is a perspective view showing a branch connection portion formed by welding.
FIG. 4B is a perspective view showing a branch connection portion formed by use of a joint terminal.
Figure 5:
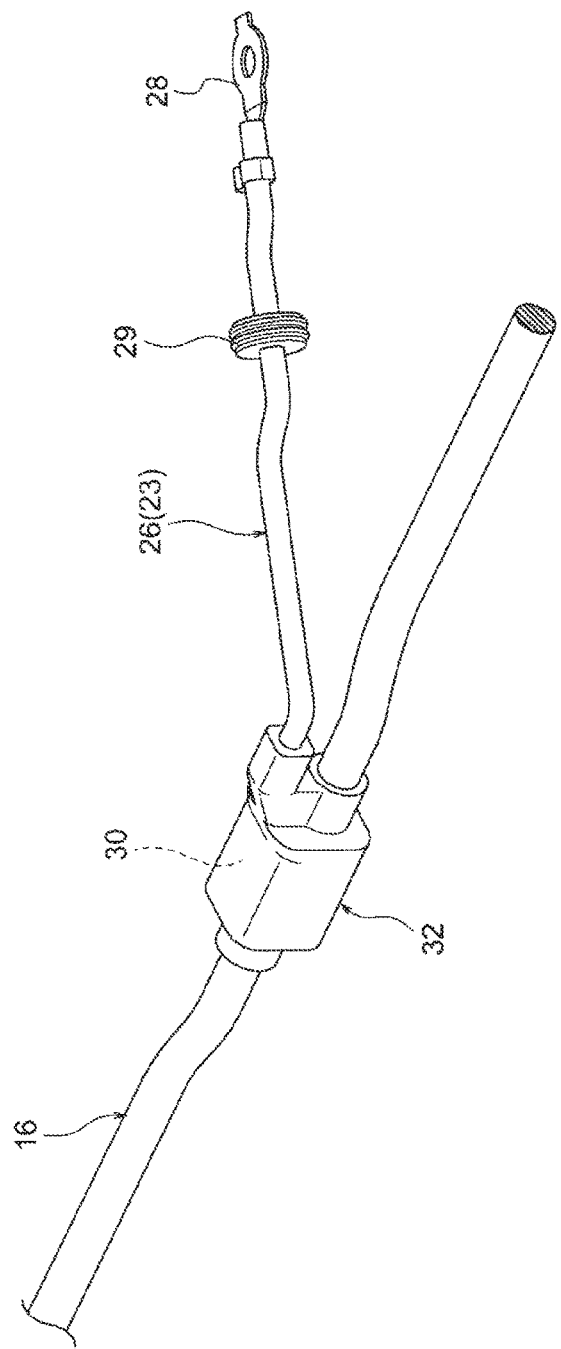
FIG. 5 is a perspective view showing an insulating and waterproofing portion.
Figure 6:
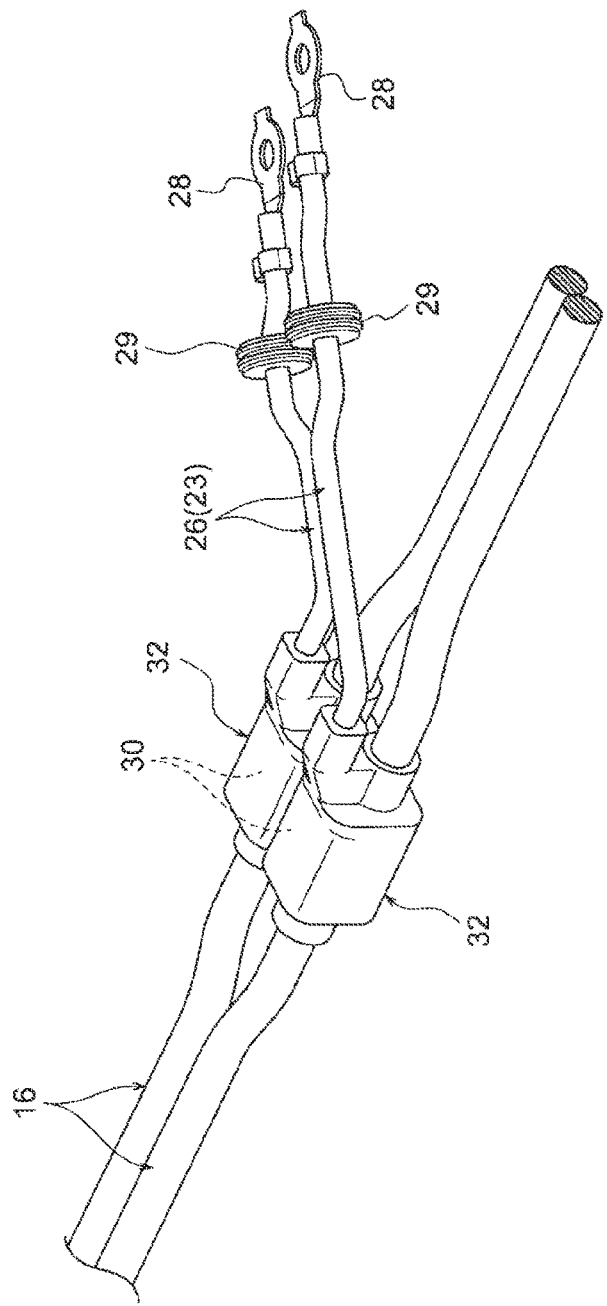
FIG. 6 is a perspective view showing a state in which insulating and waterproofing portions in FIG. 5 have been arranged.
Figure 7:
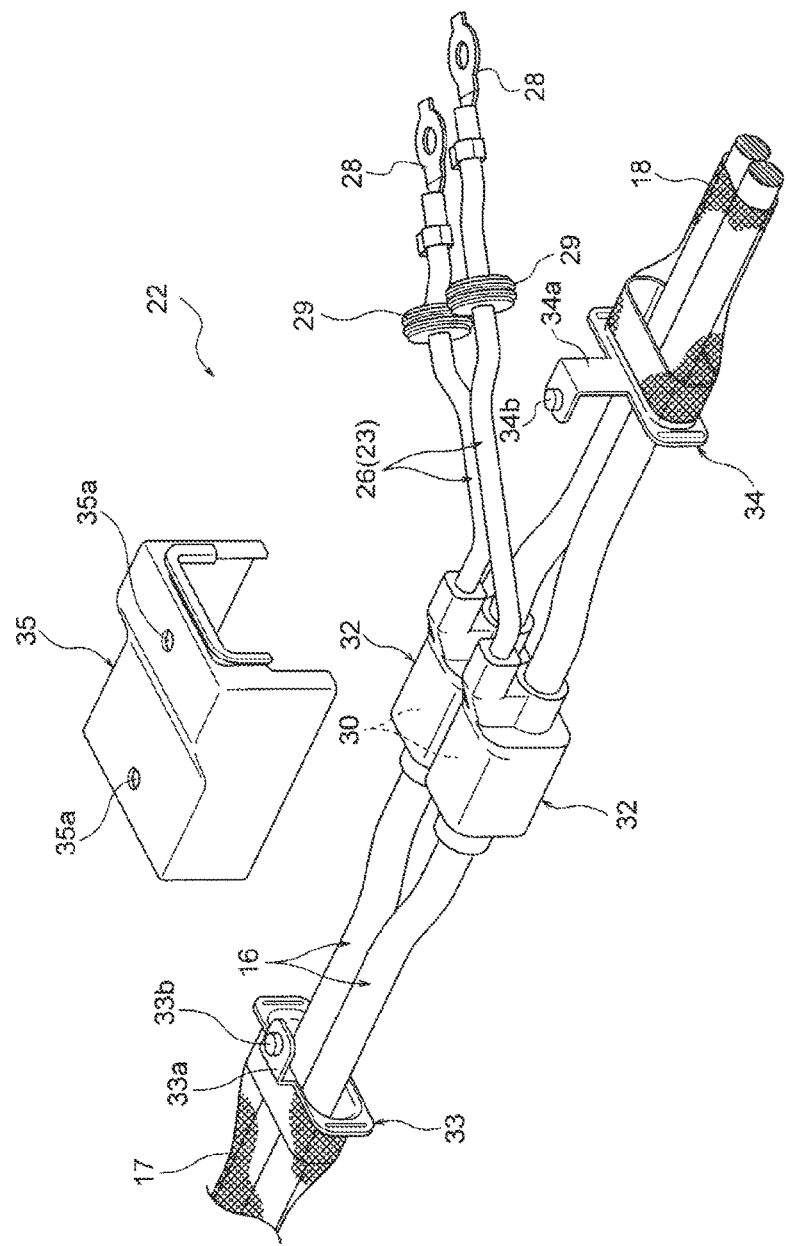
FIG. 7 is a perspective view showing a state of working for electromagnetic shielding treatment.
Figure 8:
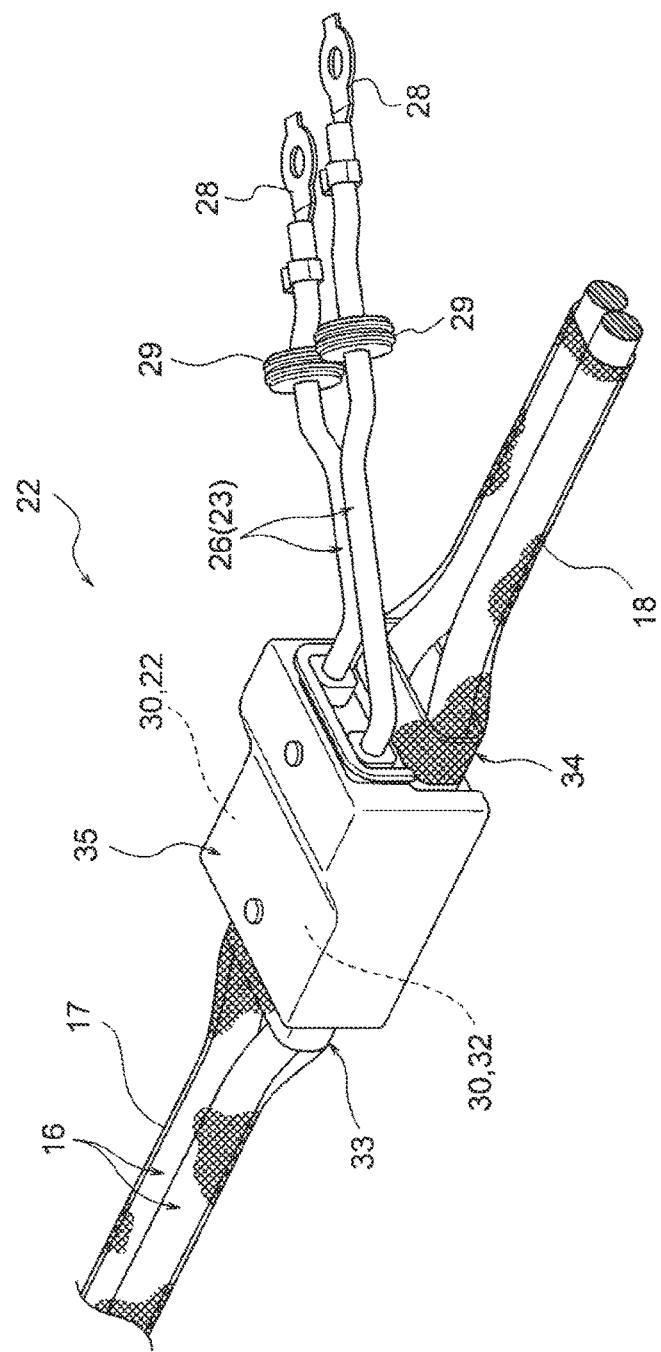
FIG. 8 is a perspective view showing a state in which the electromagnetic shielding treatment has been completed.

FIG. 4A is a perspective view showing a branch connection portion formed by welding, and FIG. 4B is a perspective view showing a branch connection portion formed by use of a joint terminal. FIG. 5 is a perspective view showing an insulating and waterproofing portion. FIG. 6 is a perspective view showing a state in which insulating and waterproofing portions in FIG. 5 have been arranged. FIG. 7 is a perspective view showing a state of working for electromagnetic shielding treatment. FIG. 8 is a perspective view showing a state in which the electromagnetic shielding treatment has been completed.

Figure 9:
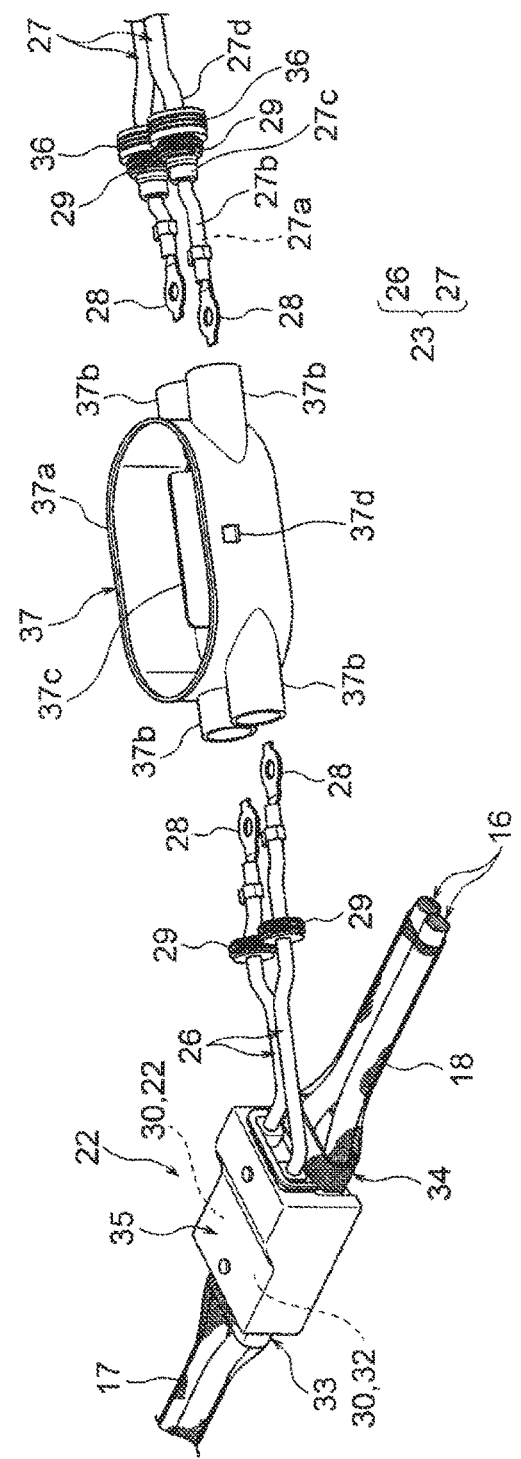
FIG. 9 is a perspective view showing a state just before branch lines are placed in a fuse box.
Figure 10:
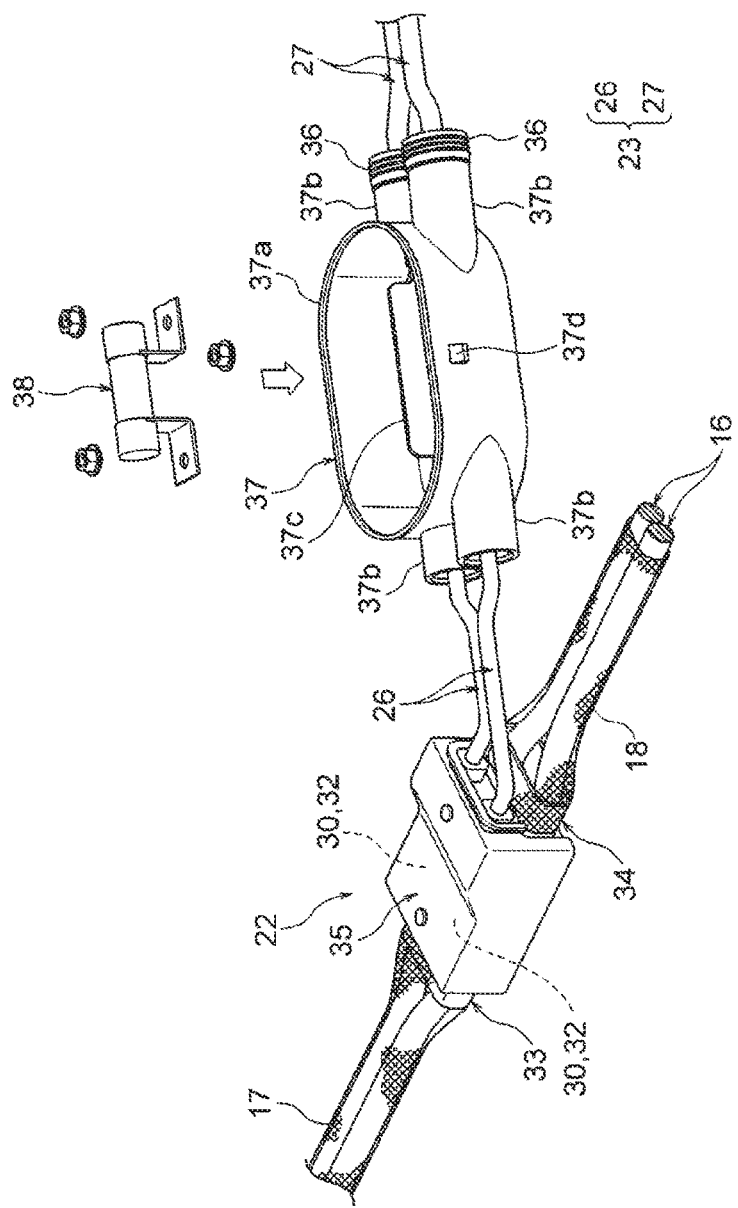
FIG. 10 is a perspective view showing a state just before a fuse is placed in the fuse box.
Figure 11:
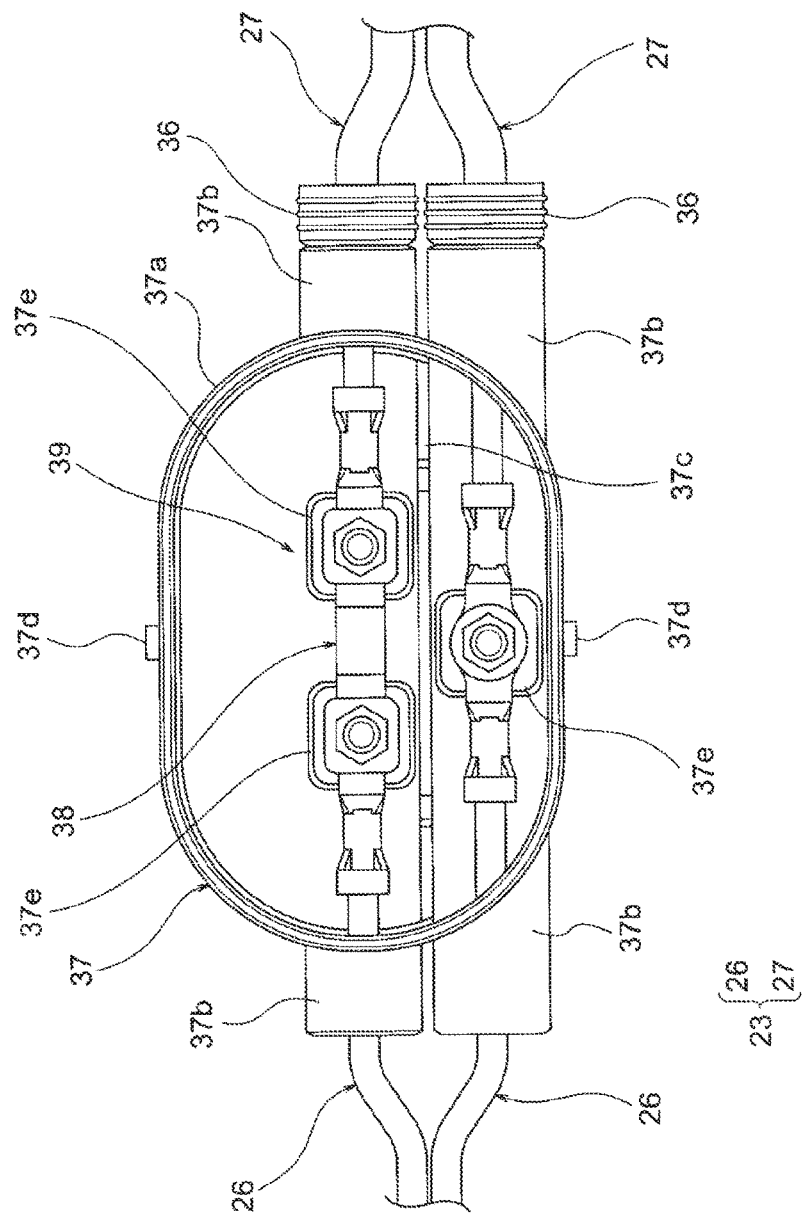
FIG. 11 is a plan view showing a state in which the fuse has been placed.
Figure 12:
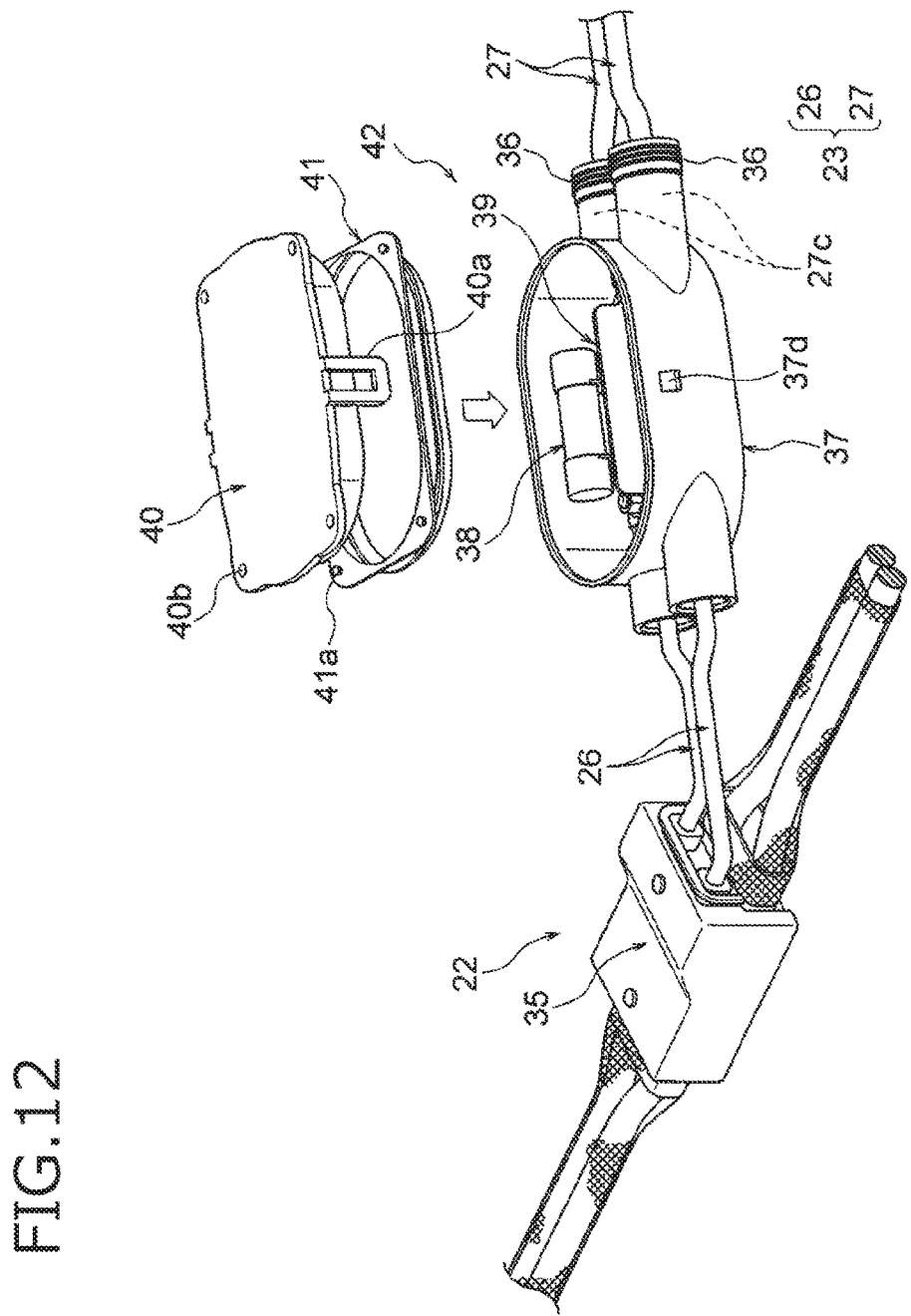
FIG. 12 is a perspective view showing a state just before a cover is placed on the fuse box.
Figure 13:
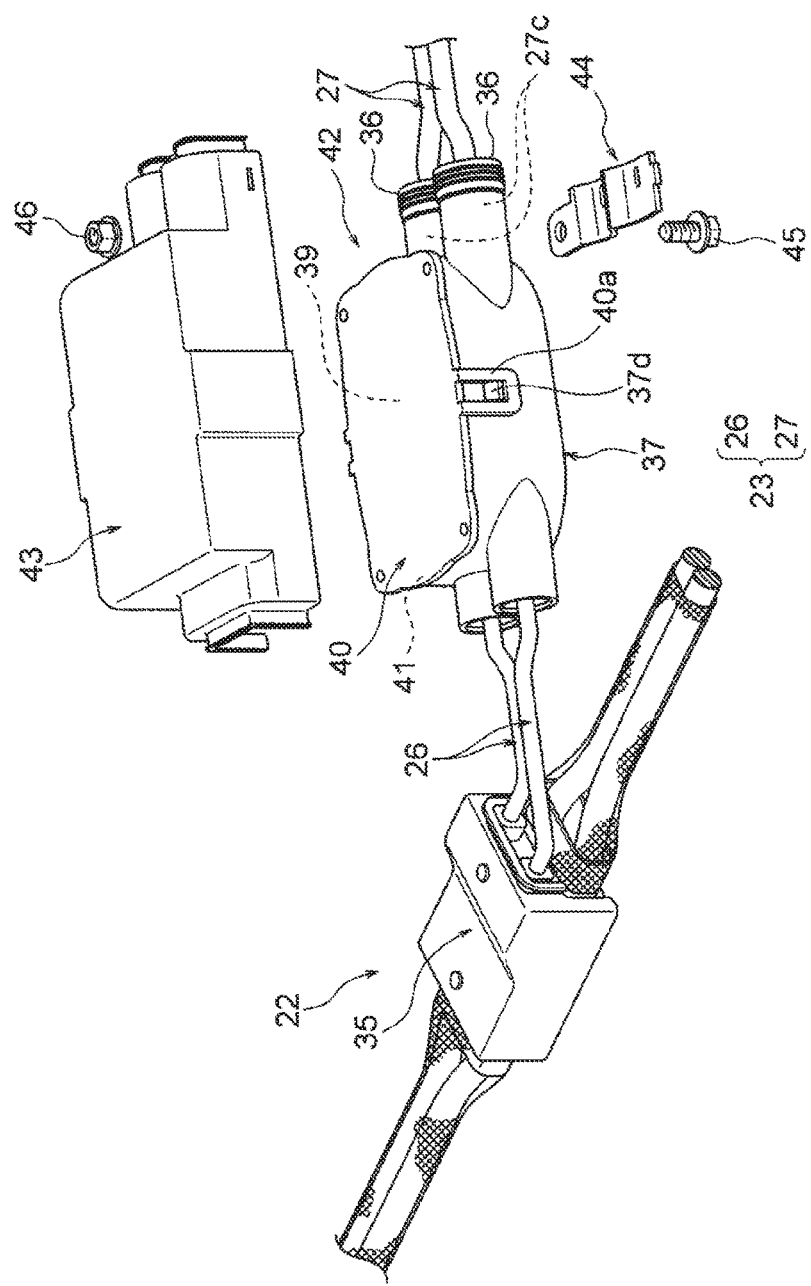
FIG. 13 is a perspective view showing a state just before a fuse box shell cover is placed.
Figure 14:
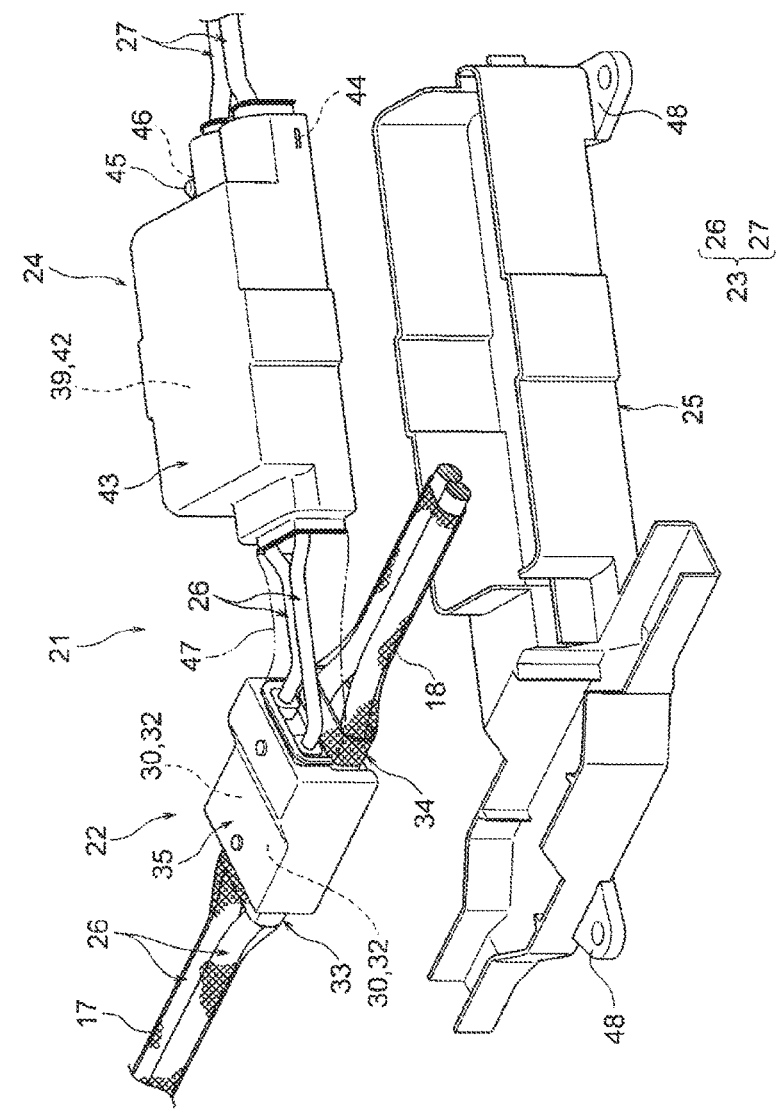
FIG. 14 is a perspective view showing a state just before the branching/overcurrent cut-off structure portion is received in a protector.

Further, FIG. 9 is a perspective view showing a state just before branch lines are placed in a fuse box. FIG. 10 is a perspective view showing a state just before a fuse is placed in the fuse box. FIG. 11 is a plan view showing a state in which the fuse has been placed. FIG. 12 is a perspective view showing a state just before a cover is placed on the fuse box. FIG. 13 is a perspective view showing a state just before a fuse box shell cover is placed. FIG. 14 is a perspective view showing a state just before the branching/overcurrent cut-off structure portion is received in a protector.

<About Conductive Path 16>

In FIGS. 4A and 4B, each conductive path 16 is configured to include a conductive conductor 16a and an insulating insulator 16b with which the conductor 16a is coated. The conductor 16a is produced out of copper, a copper alloy, aluminum, or an aluminum alloy. In the embodiment, an aluminum conductor is used because the aluminum conductor has a merit of low price and light weight (by way of example). Incidentally, the conductor 16a may have a conductor structure which consists of twisted strands or a rod-like conductor structure which is rectangular or circular in section (for example, a conductor structure which serves as a rectangular single core or a circular single core. In this case, an electric wire itself also has a rod-like shape).

The insulator 16b is formed out of a thermoplastic resin material on an outer circumferential surface of the conductor 16a by extrusion molding, as a coating with a circular shape in section. The insulator 16b is formed with a predetermined thickness. Various kinds of well-known resins can be used as the aforementioned thermoplastic resin material. For example, a suitable one is selected from high polymer materials such as polyvinylchloride resin, polyethylene resin, polypropylene resin, etc.

The conductive path 16 configured thus is used as a main line. The reference sign 16c represents a main-line-side conductor exposed portion. The main-line-side conductor exposed portion 16c is formed in such a manner that the insulator 16b in a predetermined intermediate position of the conductive path 16 serving as a main line is removed by suitable length to thereby expose the conductor 16a.

<About Branch Line 26>

In FIGS. 4A and 4B, a branch line 26 is configured to include a conductive conductor 26a, and an insulating insulator 26b with which the conductor 26a is coated. A conductor made of copper or a copper alloy, which is a different material from that of the conductor 16a of the conductive path 16 serving as a main line, is used as the conductor 26a (by way of example).

The insulator 26b is formed out of a thermoplastic resin material on an outer circumferential surface of the conductor 26a by extrusion molding, as a coating with a circular shape in section. The insulator 26b is formed with a predetermined thickness. Various kinds of well-known resins can be used as the aforementioned thermoplastic resin material. For example, a suitable one is selected from high polymer materials such as polyvinylchloride resin, polyethylene resin, polypropylene resin, etc.

The branch line 26 configured thus is used for branching from the middle of the conductive path 16 serving as a main line. The reference sign 26c in the branch line 26 represents a branch-line-side conductor exposed portion. The branch-line-side conductor exposed portion 26c is formed in such a manner that the insulator 26b at one end of the branch line 26 is removed by suitable length to thereby expose the conductor 26a. A terminal fitting 28 and a water stopper 29 are provided on the other end side of the branch line 26. The terminal fitting 28 is a so-called crimp terminal, where a bolt insertion hole is formed in an electric contact portion. A so-called rubber stopper is used as the water stopper 29. The water stopper 29 is one of members constituting an insulating and waterproofing portion 42, which will be described later. Incidentally, the two branch lines 26 are formed so that one of them is a little longer than the other.

<About Branch Connection Portion 30>

In FIGS. 4A and 4B, the reference numeral 30 represents a branch connection portion. The branch connection portion 30 is formed by electric connection between the main-line-side conductor exposed portion 16c and the branch-line-side conductor exposed portion 26c. The branch connection portion 30 in FIG. 4A is connected by a suitable joining technique such as welding. On the other hand, the branch connection portion 30 in FIG. 4B is connected by fastening with a joint terminal 31 made of metal. Either FIG. 4A or FIG. 4B may be used as the branch connection portion 30.

<About Insulating and Waterproofing Portion 32>

In FIG. 5 and FIG. 6, the reference numeral 32 represents each insulating and waterproofing portion. The insulating and waterproofing portion 32 is formed to serve as a part in which insulating treatment has been performed on the branch connection portion 30 (see FIGS. 4A and 4B) and a part in which waterproofing treatment has been performed on the same. That is, the insulating and waterproofing portion 32 is formed to function as an insulating part and a waterproofing part. In the embodiment, the insulating and waterproofing portions 32 are, for example, formed into illustrated parts by resin molding (their shapes are exemplary, and they may be, for example, not arranged but integrated). Incidentally, when the insulating and waterproofing portions 32 are formed (by resin molding), drawing positions and angles of the branch lines 26 can be set suitably.

<About Cylindrical Braids 17 and 18>

In FIG. 7, the cylindrical braids 17 and 18 are members for electromagnetic shielding. Each cylindrical braid 17, 18 is formed into a cylindrical shape out of thin metal wires by braiding. One end of the cylindrical braid 17, 18 is connected and fixed to a not-shown shield shell of the front or rear shield connector 14 (see FIG. 1). The other end of the cylindrical braid 17, 18 is connected to the shielding member 35 through a shield shell 33, 34. Incidentally, metal foil may be used in place of the cylindrical braid 17, 18.

A locking collar portion 33a, 34a is formed in the shield shell 33, 34. A lock protrusion 33b, 34b to be locked to the shielding member 35 is formed in the collar portion 33a, 34a (the lock structure is exemplary).

<About Shielding Member 35>

In FIG. 7, the shielding member 35 is a conductive metal member having a box-like shape. The shielding member 35 is formed to cover the insulating and waterproofing portions 32 so that electromagnetic shielding treatment can be applied thereto. Incidentally, though not shown, the shielding member 35 may have a structure in which a part of the shielding member 35 can penetrate the protector 25 (see FIG. 2 and FIG. 14), which will be described later, to touch a vehicle body or the like. Two lock holes 35a serving as lock parts to the shield shells 33 and 34 are formed in the shielding member 35.

When the two insulating and waterproofing portions 32 are covered with the shielding member 35, and when the shield shells 33 and 34 are attached (locked) to the shielding member 35, electromagnetic shielding treatment in the branching part is completed (see FIG. 8). Assembling the branching structure portion body 22 is also completed.

<About Branch Line 27>

In FIG. 9, each branch line 27 is a so-called shield electric wire, which is configured to include a conductive conductor 27a, an insulating insulator 27b covering the conductor 27a, a braid 27c provided outside the insulator 27b, and a sheath 27d covering the braid 27c. A conductor made of the same copper or copper alloy as the conductor 26a of each branch line 26 is used as the conductive path 27a (by way of example). The braid 27c is a member for electromagnetic shielding. The braid 27c is formed into a cylindrical shape out of thin metal wires by braiding.

The insulator 27b and the sheath 27d are formed out of a thermoplastic resin material on the outer circumferential surfaces of the conductor 27a and the braid 27c by extrusion molding as coatings each having a circular shape in section. Each of the insulator 27b and the sheath 27d is formed with a predetermined thickness. Various kinds of well-known resins can be used as the aforementioned thermoplastic resin material. For example, a suitable one is selected from high polymer materials such as polyvinylchloride resin, polyethylene resin, polypropylene resin, etc.

The branch lines 27 configured thus are used for branching from the middles of the conductive paths 16 serving as main lines, in the same manner as the branch lines 26. A terminal fitting 28, a water stopper 29, and a conductive shield terminal 36 are provided on one end side of each branch line 27. The braid 27c is connected to the shield terminal 36 by a suitable method. Incidentally, the two branch lines 27 are formed so that one of them is a little longer than the other. The branch lines 26 and 27 are electrically connected to each other after they are inserted into a fuse box 37.

<About Fuse Box 37>

In FIGS. 9 to 11, the fuse box 37 includes an insulating box body 37a made of resin, four branch line insertion holes 37b, a partition 37c, and cover locking protrusions 37d. The box body 37a is formed into an oval shape in planar view. Each branch line insertion hole 37b is formed integrally with a side wall of the box body 37a so as to penetrate the side wall. The partition 37c is formed into a wall-like shape inside the box body 37a. The cover locking protrusions 37d are formed on an outer surface of the box body 37a. The fuse box 37 also includes three terminal bases 37e inside the box body 37a. Each terminal base 37e includes a stud bolt and a nut. The terminal base 37e is disposed so that the branch lines 26 and 27 can be electrically connected to each other or the branch lines 26 and 27 can be electrically connected to each other through a fuse 38.

<About Overcurrent Cut-Off Portion 39>

When the branch lines 26 and 27 are completely electrically connected to each other or the branch lines 26 and 27 are completely electrically connected to each other through a fuse 38, an overcurrent cut-off portion 39 is formed as shown in FIG. 11. After that, an opening portion of the box body 37a is covered with a cover 40.

<About Cover 40>

In FIG. 12, the cover 40 is a cover-like member covering the opening portion of the box body 37a as described above. The cover 40 has U-shaped lock arms 40a which can be locked to the cover locking protrusions 37d of the box body 37a. The reference sign 40b in the cover 40 represents each of through holes for lock protrusions 41a of a waterproof packing 41. The waterproof packing 41 is used when the opening portion of the box body 37a is covered with the cover 40. The waterproof packing 41 is one of members constituting the insulating and waterproofing portion 42, which will be described later.

<About Insulating and Waterproofing Portion 42 and Overcurrent Cut-Off Structure Portion Body 24>

In FIG. 12 and FIG. 13, when the opening portion of the box body 37a is covered with the cover 40, the insulating and waterproofing portion 42 is provided in the middle of the branch line 23 constituted by the two branch lines 26 and the two branch lines 27. The insulating and waterproofing portion 42 is disposed near the branching structure portion body 22. When electromagnetic shielding treatment is applied to the insulating and waterproofing portion 42, assembling the overcurrent cut-off structure portion body 24 is completed. The aforementioned electromagnetic shielding treatment is configured to include a shielding member 43, a shield terminal connection member 44, a bolt 45, a nut 46, and a metal foil 47 (see FIG. 14).

<About Shielding Member 43>

In FIG. 13, the shielding member 43 is a conductive metal member having a box-like shape. The shielding member 43 is formed to cover the insulating and waterproofing portion 42 including the overcurrent cut-off portion 39, so that electromagnetic shielding treatment can be applied thereto.

Incidentally, though not shown, the shielding member 43 may have a structure in which a part of the shielding member 43 can penetrate the protector 25 (see FIG. 14), which will be described later, to touch the vehicle body or the like, in the same manner as the shielding member 35. Attachment portions (with no reference signs) to the shield terminal connection member 44 are formed in the shielding member 43.

<About Shield Terminal Connection Member 44>

In FIG. 13, the shield terminal connection member 44 is provided as a member for making the shielding member 43 and the shield terminal 36 contact each other. The shield terminal connection member 44 is attached to the shielding member 43 so as to press the shield terminal 36. The bolt 45 and the nut 46 are used for the attachment.

When the shield terminal connection member 44 is attached, the braids 27c of the branch lines 27 are electrically connected to the shielding member 43 through the shield terminal connection member 44 and the shield terminal 36. When the metal foil 47 is then attached to cover the branch lines 26 as shown in FIG. 14, electromagnetic shielding treatment on the overcurrent cut-off portion 39 side is completed. Assembling the overcurrent cut-off structure portion body 24 is also completed.

<About Protector 25 and not-Shown Protector Cover>

In FIG. 14, the protector 25 is a resin molded article. The protector 25 is formed into a shape in which the branching structure portion body 22 and the overcurrent cut-off structure portion body 24 can be received and integrated. A plurality of fixation portions 48 for fixing the branching/overcurrent cut-off structure portion 21 in a predetermined position are formed in the protector. On the other hand, a not-shown protector cover is formed so that an opening portion of the protector 25 in which the branching structure portion body 22 and the overcurrent cut-off structure portion body 24 have been received can be covered with the protector cover.

<About Summary and Effect of Wire Harness 9>

As has been described with reference to FIG. 2 to FIG. 6, the wire harness 9 according to the invention has a structure in which the conductive paths 16 are used as main lines, the branch lines 23 are connected to the middles of the conductive lines 16 serving as the main lines, and the overcurrent cut-off portion 39 is further disposed in the middles of the branch lines 23. Specifically, the branching/overcurrent cut-off structure portion 21 is provided. As for the branching/overcurrent cut-off structure portion 21, insulating and waterproofing portions 32 and 42 are provided in a connection part (branch connection portion 23) between each conductive path 16 serving as the main line and each branch line 23, and the overcurrent cut-off portion 39 respectively. Thus, the branch connection portion 23 and the overcurrent cut-off portion 39 are insulated and waterproofed. There is no problem about branching in spite of the high-voltage wire harness 9. In addition, according to the wire harness 9 according to the invention, the shielding members 35 and 43 are provided so that the insulating and waterproofing portions 32 and 42 can be covered and electromagnetically shielded with the shielding members 35 and 43. In addition, the protector 25 is provided so that the insulating and waterproofing portions 32 and 42 covered with the shielding members 35 and 43 can be received therein and protected from the outside. Further, since the protector 25 is provided, the wire harness 9 can be wired easily in spite of existence of a branching part or a part cutting off an overcurrent.

Therefore, according to the wire harness 9 of the invention, there is an effect that it is possible to improve workability in connection with devices (accessories) and reduce the cost. According to provision of the wire harness 9 of the invention, there is an effect that not only is it possible to establish electric connection between devices (accessories) located at the harness terminals 13 but it is also possible to establish electric connection with another device (accessory), and there is an effect that an overcurrent can be prevented from flowing.

It is a matter of course that various changes can be made on the invention without change the gist of the invention.

What is claimed is:

1. A wire harness comprising:
   a conductive path, configured to electrically connect between high-voltage devices, comprising:
      a main line; and
      a branch line that branches from the main line; and
   an overcurrent cut-off portion disposed on a way of the branch line to cut off an overcurrent;
   a first insulating and waterproofing portion that is provided for a branch connection portion and performs electrical insulating function and waterproof function to an exterior of the branch connection portion;
   a second insulating and waterproofing portion that is provided for the overcurrent cut-off portion and performs electrical insulating function and waterproof function to the overcurrent cut-off portion;
   a first electromagnetic shielding member that covers the first insulating and waterproofing portion to shield the first insulating and waterproofing portion;
   a second electromagnetic shielding member that covers the second insulating and waterproofing portion to shield the second insulating and waterproofing portion; and
   a protector that receives the first and second insulating and waterproofing portions respectively covered with the first and second electromagnetic shielding members,
   wherein the branch connection portion is provided on an electric connection part where the branch line is electrically connected to the main line.

2. The wire harness according to claim 1, wherein the first insulating and waterproofing portion surrounds the branch connection portion, and the second insulating and waterproofing portion surrounds the overcurrent cut-off portion.

3. The wire harness according to claim 1, wherein the first and second electromagnetic shielding members are each formed with an opening that exposes the first and second insulating and waterproofing portions to the protector, respectively.

4. The wire harness according to claim 1, wherein the protector comprises:
   a first body portion extending in a first direction and configured to receive the first insulating and waterproofing portion such that the main line extends inside the first body portion in the first direction; and
   a second body portion extending in a second direction, different from the first direction, and configured to receive the second insulating and waterproofing portion such that the branch line extends inside the second body in the second direction.

5. The wire harness according to claim 1, wherein the second insulating and waterproofing portion comprises:
   an insulating box body configured to receive the overcurrent cut-off portion through an opening of the insulating box body; and a cover configured to cover the opening of the insulating box body.

\* \* \* \* \*